US010382570B2

(12) United States Patent
Fujishiro et al.

(10) Patent No.: US 10,382,570 B2
(45) Date of Patent: Aug. 13, 2019

(54) BASE STATION AND USER TERMINAL

(71) Applicant: KYOCERA CORPORATION, Kyoto (JP)

(72) Inventors: Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 207 days.

(21) Appl. No.: 15/512,774

(22) PCT Filed: Sep. 16, 2015

(86) PCT No.: PCT/JP2015/076223
§ 371 (c)(1),
(2) Date: Mar. 20, 2017

(87) PCT Pub. No.: WO2016/047512
PCT Pub. Date: Mar. 31, 2016

(65) Prior Publication Data
US 2017/0295248 A1 Oct. 12, 2017

Related U.S. Application Data

(60) Provisional application No. 62/056,088, filed on Sep. 26, 2014.

(51) Int. Cl.
*H04L 29/08* (2006.01)
*H04W 4/02* (2018.01)
(Continued)

(52) U.S. Cl.
CPC .............. *H04L 67/18* (2013.01); *H04L 67/16* (2013.01); *H04W 4/023* (2013.01); *H04W 48/16* (2013.01);
(Continued)

(58) Field of Classification Search
CPC ... H04W 76/14; H04W 8/005; H04W 52/367; H04W 4/023; H04W 72/04; Y02D 70/1262
See application file for complete search history.

(56) References Cited

U.S. PATENT DOCUMENTS 8,594,632 B1 * 11/2013 Azizi .................... H04W 12/06
455/411
2004/0083285 A1 * 4/2004 Nicolson ............... H04L 41/046
709/224
(Continued)

OTHER PUBLICATIONS

International Search Report issued in PCT/JP2015/076223; dated Nov. 17, 2015.
(Continued)

*Primary Examiner* — Chirag R Patel
(74) *Attorney, Agent, or Firm* — Studebaker & Brackett PC (57) ABSTRACT

A base station according to a first aspect is used in a mobile communication system supporting a D2D proximity service which enables direct device to device communication. The base station comprises: a controller that determines whether to allow a user terminal to execute transmission/reception operations of a D2D synchronization signal to directly establish device to device synchronization; and a transmitter configured to transmit information indicating results of the determination to the user terminal. The controller performs the determination based on D2D range information indicating a permissible communication range of the user terminal in the D2D proximity service.

7 Claims, 6 Drawing Sheets

(51) Int. Cl.
H04W 72/04 (2009.01)
H04W 56/00 (2009.01)
H04W 92/18 (2009.01)
H04W 48/16 (2009.01)

(52) U.S. Cl.
CPC ........... *H04W 56/00* (2013.01); *H04W 72/04* (2013.01); *H04W 92/18* (2013.01)

(56) References Cited

U.S. PATENT DOCUMENTS

| | | | | |
|---|---|---|---|---|
| 2012/0258706 A1* | 10/2012 | Yu | ............ | H04W 56/002 455/426.1 |
| 2013/0083779 A1* | 4/2013 | Ahn | ............ | H04W 72/04 370/336 |
| 2014/0064263 A1* | 3/2014 | Cheng | ............ | H04W 8/005 370/350 |
| 2014/0357269 A1* | 12/2014 | Zhou | ............ | H04W 76/14 455/434 |

OTHER PUBLICATIONS

Written Opinion issued in PCT/JP2015/076223; dated Nov. 17, 2015.

3rd Generation Partnership Project; Technical Specification Group Core Network and Terminals; Proximity-Services (ProSe) User Equipment (UE) to Proximity-Services (ProSe) Function Protocol Aspects; 3GPP TS24.334 V1.1.0; Jul. 2014; pp. 1-59; Release 12; 3GPP Organizational Partners.

NEC; "Discovery Range Class Definition and Terminology Alignment"; 3GPP TSG SA2 Meeting #103; S2-141777; May 19-23, 2014; pp. 1-7; Phoenix, Arizona, USA.

General Dynamics UK Ltd; "D2D Resource Allocation for Synchronisation Signals and Channels"; 3GPP TSG-RAN1 #78; R1-142922; Aug. 18-22, 2014; pp. 1-3; Dresden, Germany.

Huawei, Hisilicon; "Network Triggered ProSe Direct Discovery"; 3GPP TSG SA WG2 Meeting #99; S2-133709; Sep. 23-27, 2013; pp. 1-5; Xiamen, China.

Samsung; 'D2D Synchronization Procedure in "Exceptional Cases"'; 3GPP TSG RAN WG1 #78; R1-143107; Aug. 18-22, 2014; pp. 1-5; Dresden, Germany.

Kyocera; "Intra-Frequency and Inter-Frequency Neighbor Cell Support"; 3GPP TSG-RAN WG2 #87; R2-143755; Aug. 17-22, 2014; pp. 1-4; Dresden, Germany.

ITRI; "Spectrum Utilization Model for D2D Communications and Discovery"; 3GPP TSG-RAN WG1 Meeting #75; R1-135415; Nov. 11-15, 2013; pp. 1-6; San Francisco, USA.

HTC: "Updates of D12 for Network-Assisted ProSe Discovery"; 3GPP SA WG2 Meeting #100; S2-134039; Nov. 11-15, 2013; pp. 1-6; San Francisco, USA.

* cited by examiner

FIG. 8

BASE STATION AND USER TERMINAL

TECHNICAL FIELD

The present invention relates to a base station and a user terminal that are used in a mobile communication system.

BACKGROUND ART

In 3GPP (3rd Generation Partnership Project) which is a standardization project of a mobile communication system, a specification of a Device to Device (D2D) proximity service is proceeding as a new function after Release 12 (see Non Patent Document 1).

The D2D proximity service (D2D ProSe) is a service that enables direct device to device communication in a synchronous cluster made up of a plurality of synchronized user terminals. The D2D proximity service includes a D2D discovery procedure (Discovery) that discovers a proximity terminal and D2D communication (Communication) that is the direct device to device communication.

In addition, the discovery procedure in which a user terminal present in a certain cell ("serving cell") discovers a proximity terminal present in another cell (adjacent cell) is referred to as an inter-cell discovery procedure (Inter-Cell Discovery). In addition, the D2D communication in which the user terminal present in the serving cell communicates with the proximity terminal present in the adjacent cell is referred to as an inter-cell D2D communication (Inter Cell Communication).

PRIOR ART DOCUMENT

Non-Patent Document

Non Patent Document 1: 3GPP technical specification "TS24.334 V1.1.0", July 2014

SUMMARY

In order to perform an inter-cell discovery procedure and an inter-cell D2D communication between a first user terminal present in a first cell and a second user terminal present in a second cell, the first user terminal and the second user terminal are necessary to be synchronized with each other.

Since the user terminal is generally synchronized with a cell in which the user terminal itself is present, when the first cell and the second cell are asynchronous, there is a concern that the inter-cell discovery procedure and the inter-cell D2D communication may not be performed.

Herein, it is considered a method of directly establishing device to device synchronization in such a manner that the first user terminal and the second user terminal transmit and receive a synchronization signal (hereinafter, referred to as a "D2D synchronization signal") to/from a D2D proximity service.

However, since there is a problem that interference occurs due to transmission and reception of the D2D synchronization signal, it is not reasonable to admit the transmission of the D2D synchronization signal without limitation.

Therefore, it is intended to provide a base station and a user terminal that can directly establish inter-user terminal synchronization while suppressing the occurrence of interference.

A base station according to a first aspect is used in a mobile communication system supporting a D2D proximity service which enables direct device to device communication. The base station comprises: a controller configured to determine whether to allow a user terminal to execute transmission/reception operations of a D2D synchronization signal to directly establish device to device synchronization; and a transmitter configured to transmit information indicating results of the determination to the user terminal. The controller performs the determination based on D2D range information indicating a permissible communication range of the user terminal in the D2D proximity service.

A user terminal according to a second aspect is used in a mobile communication system supporting a D2D proximity service which enables direct device to device communication. The user terminal comprises: a controller that controls whether to execute transmission/reception operations of a D2D synchronization signal to directly establish device to device synchronization, based on D2D range information indicating a permissible communication range of a present user terminal in the D2D proximity service.

DESCRIPTION OF THE EMBODIMENT

Overview of Embodiment

A base station according to embodiment is used in a mobile communication system supporting a D2D proximity service which enables direct device to device communication. The base station comprises: a controller configured to determine whether to allow a user terminal to execute transmission/reception operations of a D2D synchronization signal to directly establish device to device synchronization; and a transmitter configured to transmit information indicating results of the determination to the user terminal. The controller performs the determination based on D2D range information indicating a permissible communication range of the user terminal in the D2D proximity service.

In the embodiment, the base station further comprises a receiver configured to receive the D2D range information from the user terminal. The controller performs the determination based on the D2D range information received from the user terminal.

In the embodiment, the D2D range information includes at least one of a resource allocation request, a terminal capability notification, or a D2D interest notification that is transmitted to the base station from the user terminal. The resource allocation request is information that requests assignment of a radio resource. The terminal capability notification is information that notifies capability of the user terminal. The D2D interest notification is information on interest of the user terminal in the D2D proximity service.

In the embodiment, the permissible communication range includes a permissible communication range for transmission in the D2D proximity service and a permissible communication range for reception in the D2D proximity service. The D2D range information includes information that identifies whether the permissible communication range is used for either of the transmission or the reception in the D2D proximity service.

In the embodiment, a plurality of classes including classes each corresponding to several levels of permissible communication ranges are defined. The D2D range information is information indicating any class of the plurality of classes. The plurality of classes includes: a first class that supports a wide range of the D2D proximity service including a serving cell and an adjacent cell; and a second class that supports only a narrow range of the D2D proximity service not including the adjacent cell. The controller determines to allow the user terminal to execute the transmission/reception operations of the D2D synchronization signal in response to the fact that the D2D range information indicates the first class. The controller determines to allow the user terminal not to execute the transmission/reception operations of the D2D synchronization signal in response to the fact that the D2D range information indicates the second class.

In the embodiment, the D2D proximity service includes a discovery procedure that is performed such that one user terminal discovers the other user terminal. The permissible communication range is a permissible communication range in the discovery procedure.

In the embodiment, the D2D range information is a value of the permissible communication range of the user terminal in the D2D proximity service. The controller determines to allow the user terminal to execute the transmission/reception operations of the D2D synchronization signal in response to the fact that the value of the permissible communication range is equal to or greater than a threshold. The controller determines to allow the user terminal not to execute the transmission/reception operations of the D2D synchronization signal in response to the fact that the value of the permissible communication range is less than the threshold.

In the embodiment, the controller further determines whether to notify the user terminal of a timing offset indicating deviation of inter-cell synchronization in the present base station, based on the D2D range information.

In the embodiment, the controller controls transmission power of the user terminal in the D2D proximity service, based on the D2D range information.

In the embodiment, the controller transmits the D2D range information or cell range information indicating a permissible communication range of the present cell in the D2D proximity service to the other base station that manages an adjacent cell.

A user terminal according to the embodiment is used in a mobile communication system supporting a D2D proximity service which enables direct device to device communication. The user terminal comprises: a controller that controls whether to execute transmission/reception operations of a D2D synchronization signal to directly establish device to device synchronization, based on D2D range information indicating a permissible communication range of a present user terminal in the D2D proximity service.

In the embodiment, the user terminal further comprises: a transmitter configured to transmit the D2D range information to a base station; and a receiver configured to receive information to be transmitted based on the D2D range information from the base station. The controller controls whether to execute the transmission/reception operations of the D2D synchronization signal in response to the information.

Embodiment

An embodiment of a case where the invention is applied to an LTE system will be described below.

(System Configuration)

Figure 1:
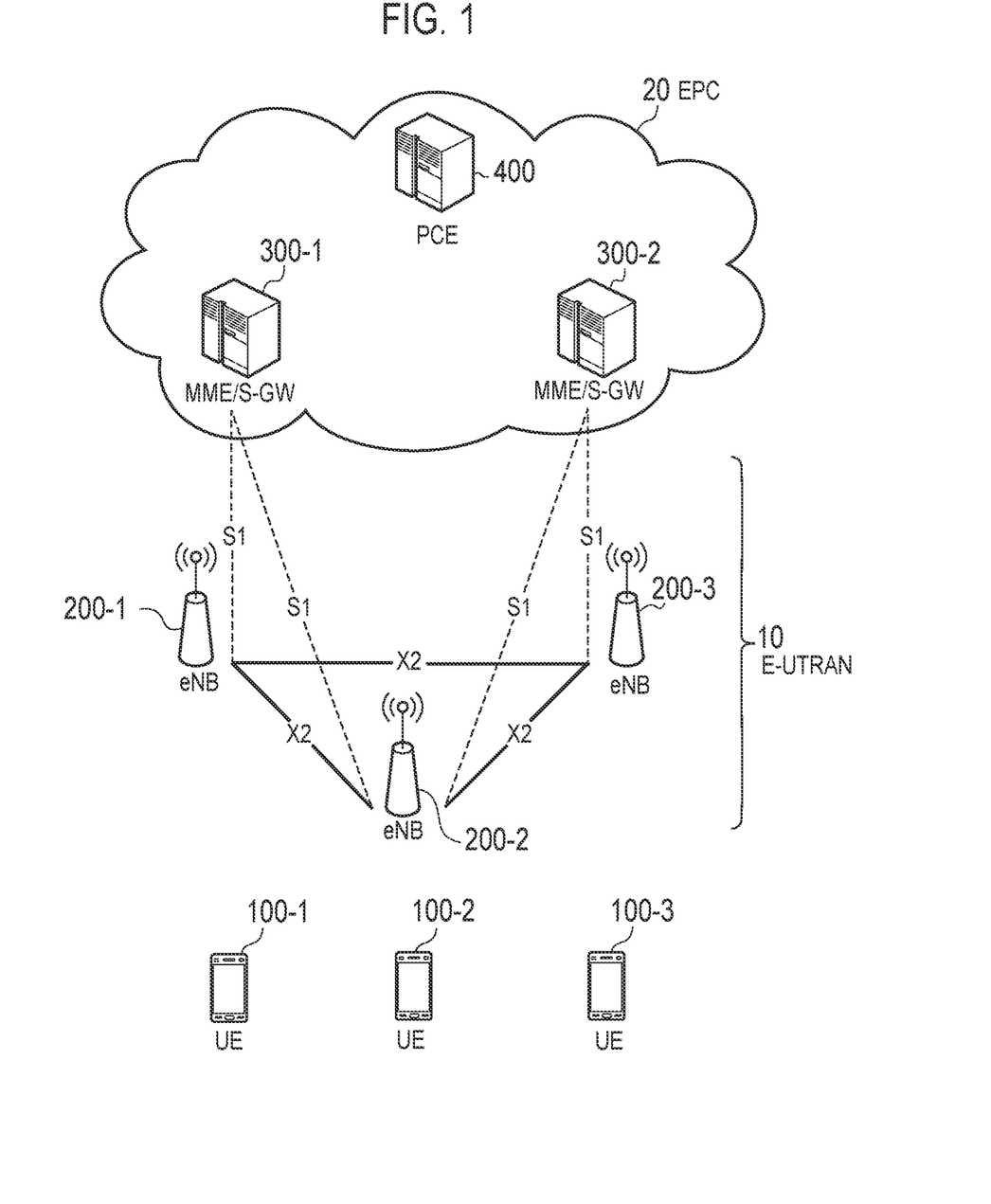
FIG. 1 is a configuration diagram of an LTE system according to an embodiment.

FIG. 1 is a configuration diagram of an LTE system according to an embodiment. As illustrated in FIG. 1, the LTE system according to the embodiment includes User Equipment (UE) 100, an Evolved-UMTS Terrestrial Radio Access Network (E-UTRAN) 10, and an Evolved Packet Core (EPC) 20.

The UE 100 corresponds to a user terminal. The UE 100 is a mobile communication device and performs radio communication with a cell (serving cell) for connection destination. The configuration of the UE 100 will be described below.

The E-UTRAN 10 corresponds to a radio access network. The E-UTRAN 10 includes evolved Node-Bs (eNBs) 200. The eNB 200 corresponds to a base station. The eNBs 200 are connected to each other through an X2 interface. The configuration of the eNB 200 will be described below.

The eNB 200 manages one or plural cells and performs radio communication with the UE 100 that establishes a connection with its own cell. The eNB 200 has, for example, a radio resource management (RRM) function, a routing function of user data, and a measurement control function for mobility control and scheduling. The "cell" is used as a term indicating a minimum unit of a radio communication area and is also used as a term indicating a function or a resource of performing radio communication with the UE 100.

The EPC 20 corresponds to a core network. A network of the LTE system is configured by the E-UTRAN 10 and the EPC 20. The EPC 20 includes Mobility Management Entity (MME)/Serving-Gateway (S-GW) 300. The MME performs, for example, various mobility controls on the UE 100. The SGW performs transfer control of user data. The MME/S-GW 300 is connected to the eNB 200 through an S1 interface.

The EPC 20 may include ProSe Control Entity (PCE) 400 for controlling a D2D proximity service (D2D ProSe). The PCE 400 corresponds to a service controller. The PCE 400 may be included in the E-UTRAN 10 rather than the EPC 20.

Figure 2:
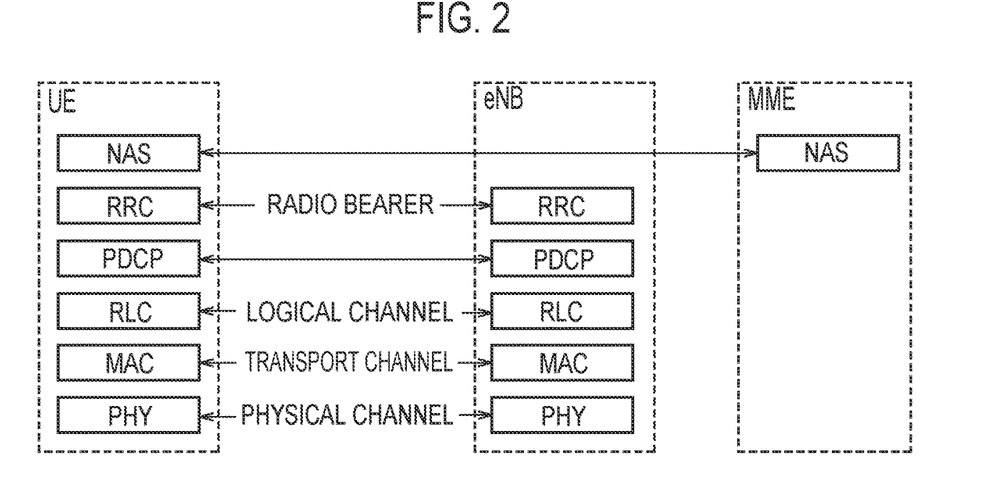
FIG. 2 is a protocol stack diagram of a radio interface in the LTE system according to the embodiment.

FIG. 2 is a protocol stack diagram of a radio interface in the LTE system. As illustrated in FIG. 2, a radio interface protocol is classified into a first layer to a third layer of an OSI reference model, wherein the first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted through a physical channel.

The MAC layer performs preferential control of data, and a retransmission process and the like by hybrid ARQ (HARQ). Between the MAC layer of the UE 100 and the MAC layer of the eNB 200, user data and control signals are transmitted through a transport channel. The MAC layer of the eNB 200 includes a transport format of an uplink and a downlink (a transport block size and a modulation and encoding scheme) and a scheduler for determining (scheduling) a resource block to be assigned to the UE 100.

The RLC layer transmits data to an RLC layer of a reception side using the functions of the MAC layer and the physical layer. Between the RLC layer of the UE 100 and the RLC layer of the eNB 200, user data and control signals are transmitted through a logical channel.

The PDCP layer performs header compression and decompression, and encryption and decryption.

The RRC layer is defined only in a control plane that handles control signals. Between the RRC layer of the UE 100 and the RRC layer of the eNB 200, control signals (RRC message) for various types of setting are transmitted. The RRC layer controls the logical channel, the transport channel, and the physical channel in response to establishment, re-establishment, and release of a radio bearer. When a connection (RRC connection) is established between the RRC of the UE 100 and the RRC of the eNB 200, the UE 100 is in a connected state (RRC connected state), and when the RRC connection is not established, the UE 100 is in an idle state (RRC idle state).

A Non-Access Stratum (NAS) layer positioned at an upper level of the RRC layer performs session management and mobility management, for example. Higher layer signaling is transmitted and received between the UE 100 and the MME 300. The higher layer signaling may be transmitted and received between the UE 100 and the PCE 400.

Figure 3:
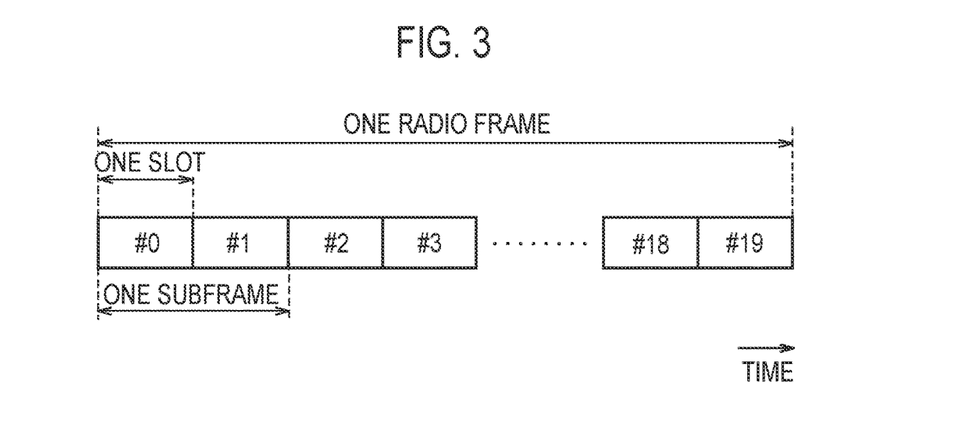
FIG. 3 is a configuration diagram of a radio frame used in the LTE system according to the embodiment.

FIG. 3 is a configuration diagram of a radio frame used in the LTE system. In the LTE system, Orthogonal Frequency Division Multiple Access (OFDMA) is employed in a downlink (DL), and Single Carrier Frequency Division Multiple Access (SC-FDMA) is employed in an uplink (UL), respectively.

As illustrated in FIG. 3, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is configured by one subcarrier and one symbol. Among the radio resources assigned to the UE 100, the frequency resource is configured by a resource block, and a time resource is configured by a subframe (or slot).

(D2D Proximity Service)

A D2D proximity service will be described below. The LTE system according to the embodiment supports the D2D proximity service.

The D2D proximity service (D2D ProSe) is a service that allows a direct inter-UE communication to perform in a synchronous cluster made up of a plurality of synchronized UEs 100. The D2D proximity service includes a D2D discovery procedure (Discovery) that discovers proximity UE and D2D communication (Communication) that is a direct inter-UE communication. The D2D communication is also referred to as direct communication.

An "In-coverage" is referred to as a scenario in which all UEs 100 forming the synchronous cluster are located in cell coverage. In the in-coverage, the UEs 100 forming the synchronous cluster may be distributed into the plurality of cells. An "Out-of-coverage" is referred to as a scenario in which all UEs 100 forming the synchronous cluster are located out of the cell coverage. A partial coverage is referred as a scenario in which some of the UEs 100 in the synchronous cluster are located in the cell coverage and the others of the UEs 100 are located out of the cell coverage.

In the in-coverage, the eNB 200 becomes a D2D synchronous source, and the UE 100 of a D2D asynchronous source is synchronized with the eNB 200 of the D2D synchronous source. The eNB 200 transmits D2D resource information indicating the radio resource available for the D2D proximity service. The UE 100 performs the D2D discovery procedure and the D2D communication based on the D2D resource information received from the eNB 200.

In contrast, in the out-of-coverage or the partial coverage, the UE 100 becomes a D2D synchronous source. In the out-of-coverage, the UE 100 of the D2D synchronous source transmits D2D synchronization signals. The D2D synchronization signal may include a primary D2D synchronization signal and a secondary D2D synchronization signal. The D2D asynchronous source is synchronized with the D2D synchronous source without transmitting the D2D synchronization signal.

The D2D discovery procedure (Discovery) is used mainly when D2D communication is performed by unicast. One UE 100 transmits D2D discovery signals (Discovery signals) using the radio resource for D2D discovery procedure when starting the D2D communication with the other UE 100. The other UE 100 monitors the Discovery signal in the radio resources for D2D discovery procedure and receives the Discovery signal.

(Operating Environment According to the Embodiment)

Figure 4:
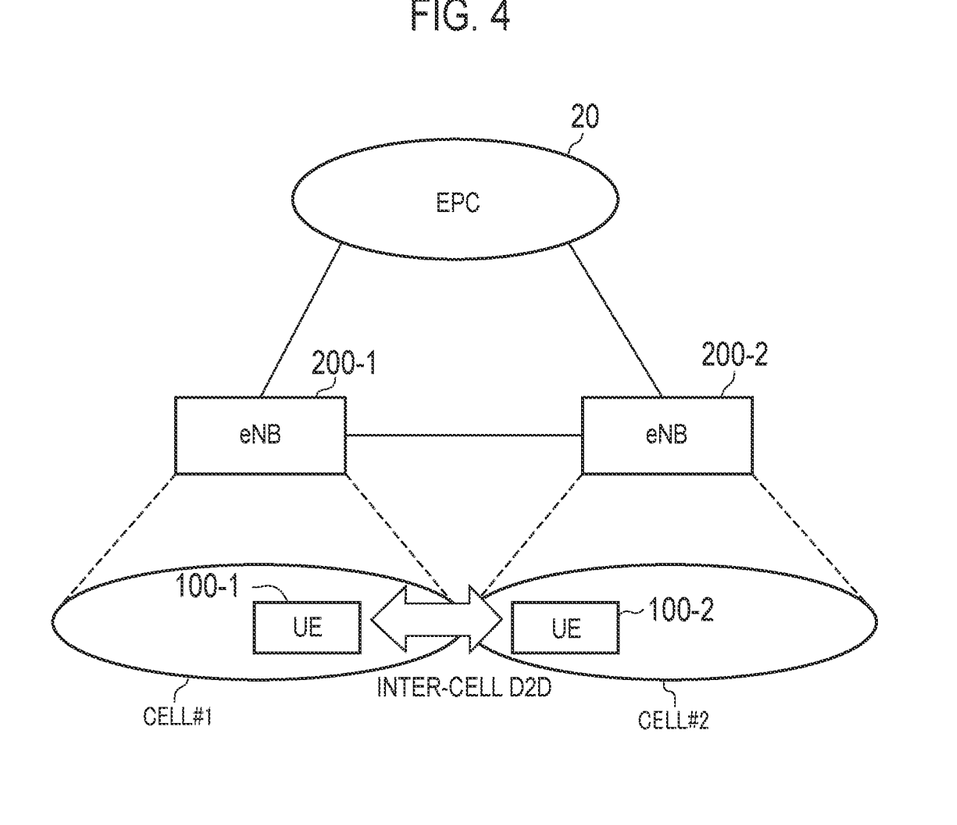
FIG. 4 is a diagram illustrating an operating environment according to the embodiment.

An operating environment according to the embodiment will be described below. FIG. 4 is a diagram illustrating the operating environment according to the embodiment.

In the embodiment, as illustrated in FIG. 4, it is assumed that the D2D discovery procedure (and D2D communication) is mainly performed between a UE 100-1 present in a cell #1 and a UE 100-2 present in a cell #2 as a case. In FIG. 4, the cell #1 and the cell #2 are adjacent to each other, but one or more cells may be present between the cell #1 and the cell #2. Furthermore, FIG. 4 illustrates an example in which an eNB 200 #1 forms the cell #1 and an eNB 200 #2 forms the cell #2.

In order to perform the D2D discovery procedure between the UE 100-1 and the UE 100-2, it is necessary that the UE 100-1 and the UE 100-2 are synchronized with each other. Since the UE 100 is generally synchronized with the cell in which the UE 100 itself is present, there is a concern that an inter-cell discovery procedure and an inter-cell D2D communication may not be performed when the cell #1 and the cell #2 are asynchronous.

Therefore, a method of establishing direct inter-UE synchronization even in the in-coverage by transmitting and receiving the D2D synchronization signal using the UE 100-1 and the UE 100-2 is considered. However, since interference may be caused by the transmission and reception of the D2D synchronization signal, it is not reasonable to admit the transmission of the D2D synchronization signal without limitation. A configuration and an operation for establishing direct synchronization between the UEs 100 while suppressing occurrence of interference will be described below.

(Configuration of User Terminal)

Figure 5:
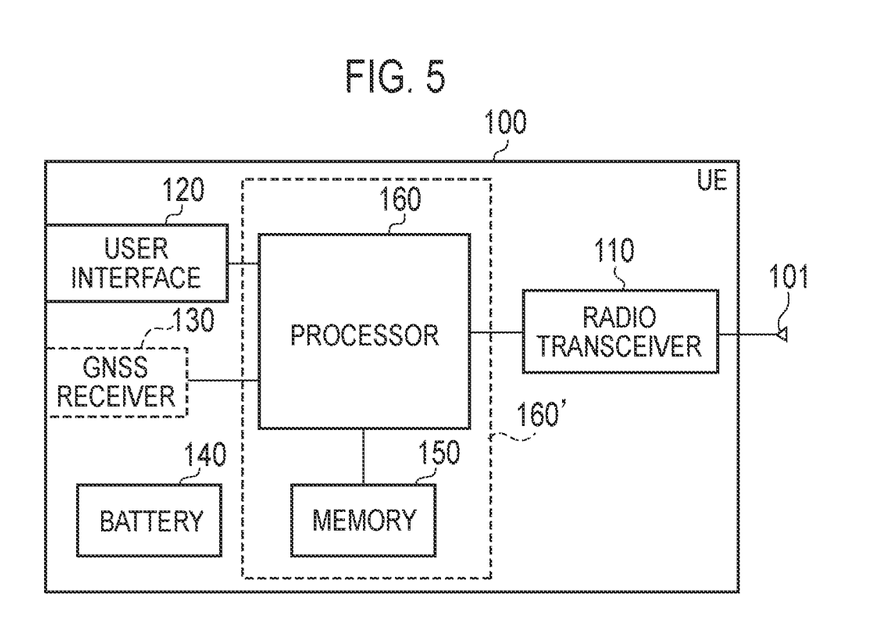
FIG. 5 is a block diagram of UE 100 (user terminal) according to the embodiment.

FIG. 5 is a block diagram of the UE 100 (user terminal). As illustrated in FIG. 5, the UE 100 includes an antenna 101, a radio transceiver 110, a user interface 120, a Global Navigation Satellite System (GNSS) receiver 130, a battery 140, a memory 150, and a processor 160. The radio transceiver 110 constitutes a transmitter and a receiver. The memory 150 corresponds to a storage unit, and the processor 160 corresponds to a controller. The UE 100 may not include the GNSS receiver 130. In addition, the memory 150 may be integrally formed with the processor 160, and this integrated set (that is, chipset) may be called a processor 160'.

The antenna 101 and the radio transceiver 110 are used to transmit and receive a radio signal. The radio transceiver 110 converts a baseband signal (transmission signal) output from the processor 160 into the radio signal, and transmits the radio signal from the antenna 101. Furthermore, the radio transceiver 110 converts the radio signal received by the antenna 101 into the baseband signal (reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a Central Processing Unit (CPU) that performs various processes by executing the program stored in the memory 150. The processor 160 may further include a codec that performs encoding and decoding of sound and video signals. The processor 160 implements various processes and various communication protocols.

In the embodiment, the processor 160 controls whether to execute transmission/reception operations of the D2D synchronization signal to establish the direct inter-UE synchronization based on range information (hereinafter, referred to "D2D range information") indicating a permissible communication range of the UE 100 itself in the D2D proximity service. The D2D range information is set by, for example, higher layer signaling and is stored in the memory 150. The transmission/reception operations of the D2D synchronization signal refer to at least one of transmission and reception (monitor) of the D2D synchronization signal.

Here, the permissible communication range of the UE 100 itself is a permissible communication range for transmission (announcing). Alternatively, the permissible communication range of the UE 100 itself may be a permissible communication range for reception (monitoring). Alternatively, the permissible communication range of the UE 100 itself may be a combination of the permissible communication range for transmission (announcing) and the permissible communication range for reception (monitoring).

An example in which one type of D2D range information is associated with the UE 100 will be described below. However, the D2D range information may be associated with a D2D application to be executed by the UE 100. In this case, the D2D range information is stored in the memory 150 for each D2D application, and thus the processor 160 acquires the D2D range information from the memory 150 according to the D2D application to be executed. In addition, the D2D range information may be associated with a Public Land Mobile Network (PLMN).

In the embodiment, a plurality of classes including classes each corresponding to several levels of permissible communication ranges are defined. The D2D range information is information indicating any class of the plurality of classes. Furthermore, in the embodiment, the permissible communication range is a permissible communication range in the D2D discovery procedure (Discovery). Hereinafter, such a class is referred to as a "Discovery range class". The D2D range information may include information for identifying whether to be the permissible communication range for transmission (announcing) or the permissible communication range for reception.

For example, the Discovery range class includes a first class (hereinafter, referred to as a "long class") which supports a wide range of D2D proximity service including a serving cell and an adjacent cell. Here, the "wide range" is a range covering not only the adjacent cell but also the next adjacent cell. With respect to the UE 100 belonging to the long class, in order to enable the inter-cell discovery procedure at the wide range, it is preferable to establish the inter-UE synchronization using the D2D synchronization signal.

In addition, the Discovery range class includes a second class (hereinafter, referred to as a "short class") which supports only a narrow range of D2D proximity service not including the adjacent cell. Here, the "narrow range" is a range of about several meters, for example. With respect to the UE 100 belonging to the short class, since there is less necessity to enable the inter-cell discovery procedure, it is preferable not to transmit and receive the D2D synchronization signal. The reason is that the transmission and reception of the D2D synchronization signal may result in the interference and an increase in power consumption of the UE 100 at the same time. Even in the UE 100 belonging to the short class, when the UE 100 is located near a cell boundary, a cellular synchronization signal (PSS, SSS) may be received from the adjacent cell. In this case, it is possible to perform the inter-cell discovery procedure by establishing the inter-UE synchronization.

Moreover, the Discovery range class may include a third class (hereinafter, referred to as a "middle class") between the long class and the short class. The middle class supports a D2D proximity service in the range of only a serving cell and an adjacent cell. With the respect to the middle class, it may be treated in the same way as the long class or may be treated in the same way as the short class. In the embodiment, a case where the middle class is treated in the same way as the short class will be described as an example.

In the embodiment, the processor 160 transmits the D2D range information acquired from the memory 150 to the eNB 200 through the radio transceiver 110.

For example, the processor 160 may transmit a UE capability notification including the D2D range information to the eNB 200. The UE capability notification is a notification defined by the RRC layer. In this case, the processor 160 may transmit the UE capability notification including the D2D range information to the eNB 200 in response to a request from the eNB 200.

Alternatively, the processor 160 may transmit a resource allocation request including the D2D range information to the eNB 200. The resource allocation request may include a scheduling request (SR) or a buffer status report (BSR).

Alternatively, the processor 160 may transmit a D2D interest notification including the D2D range information to the eNB 200. The D2D interest notification is a notification relating to interest in the D2D proximity service and is defined by the RRC layer. The D2D interest notification includes information indicating to be interested in the D2D proximity service/not to be interested in the D2D proximity service any more. In addition, the D2D interest notification may include at least one of the following information elements.

Discovery/Communication

This information element is set to either of "Discovery" indicating interest in Discovery or "Communication" indicating interest in Communication.

Announcing (Transmitting)/Monitoring (Receiving)

This information element is set to either of "announcing (transmitting)" indicating interest in transmission in the D2D proximity service or "monitoring (receiving)" indicating interest in reception (monitor) in the D2D proximity service.

Inter-PLMN/Intra-PLMN

This information element is set to either of "inter-PLMN" indicating interest in D2D communication between different public land mobile networks (PLMNs) or "intra-PLMN" indicating interest in D2D communication within the same PLMN.

Inter-Frequency/Intra-Frequency

This information element is set to either of "inter-frequency" indicating interest in D2D proximity service between different frequencies or "intra-frequency" indicating interest in D2D proximity service within the same frequency.

Inter-Cell/Intra-Cell

This information element is set to either of "inter-cell" indicating interest in D2D proximity service between different cells or "intra-cell" indicating interest in D2D proximity service within the same cell.

Frequency List

This information element is a list showing one or more frequencies at which the UE 100 would like to use in the D2D proximity service.

The radio transceiver 110 receives information to be transmitted from the eNB 200 based on the D2D range information. The processor 160 controls whether to execute the transmission/reception operations of the D2D synchronization signal in response to the received information.

In a case where the received information indicates that the transmission/reception operations of the D2D synchronization signal is executed, the processor 160 controls the radio transceiver 110 so as to execute the transmission/reception operations of the D2D synchronization signal. Whereas, in a case where the received information indicates that the transmission/reception operations of the D2D synchronization signal is not executed, the processor 160 controls the radio transceiver 110 so as not to execute the transmission/reception operations of the D2D synchronization signal.

(Configuration of Base Station)

Figure 6:
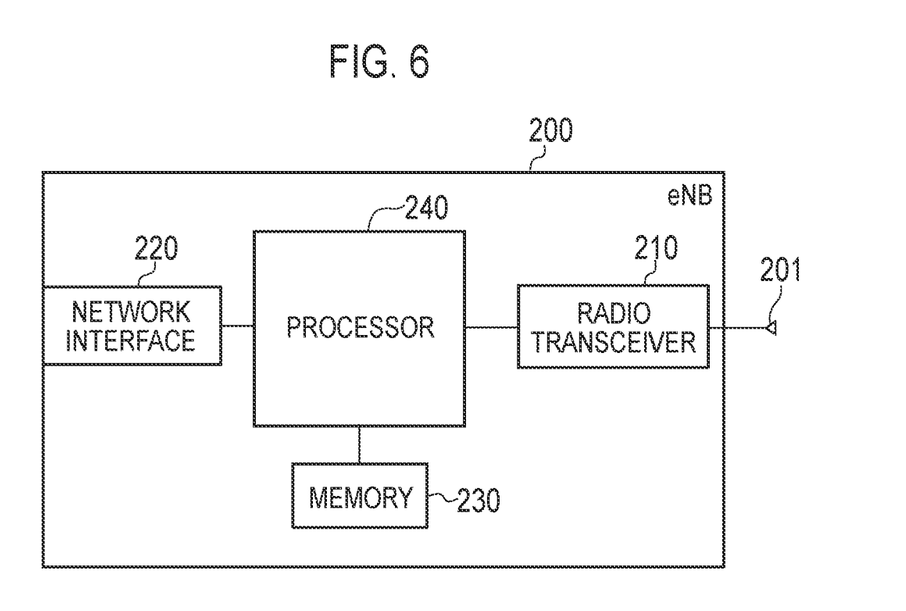
FIG. 6 is a block diagram of eNB 200 (base station) according to the embodiment.

FIG. 6 is a block diagram of the eNB 200 (base station). As illustrated in FIG. 6, the eNB 200 includes an antenna 201, a radio transceiver 210, a network interface 220, a memory 230, and a processor 240. The radio transceiver 210 constitutes a transmitter and a receiver. The memory 230 corresponds to a storage unit and the processor 240 corresponds to a controller.

The antenna 201 and the radio transceiver 210 are used to transmit and receive a radio signal. The radio transceiver 210 converts the baseband signal (transmission signal) output from the processor 240 into the radio signal, and transmits the radio signal from the antenna 201. Furthermore, the radio transceiver 210 converts the radio signal received by the antenna 201 into the baseband signal (reception signal), and outputs the baseband signal to the processor 240.

The network interface 220 is connected to the adjacent eNB 200 through the X2 interface and is connected to the MME/S-GW 300 through the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 implements various processes and various communication protocols.

In the embodiment, the radio transceiver 210 receives the D2D range information transmitted from the UE 100. The range information may be included in the UE capability notification or the D2D interest notification transmitted from the UE 100.

The processor 240 determines whether to allow the UE 100 to execute the transmission/reception operations of the D2D synchronization signal based on the received D2D range information. For example, when the D2D range information indicates the permissible communication range for the transmission (announcing), the processor 240 determines whether to allow the UE 100 to transmit the D2D synchronization signal based on the D2D range information. When the D2D range information indicates the permissible communication range for the reception (monitoring), the processor 240 may determine whether to allow the UE 100 to receive (monitor) the D2D synchronization signal based on the D2D range information.

In the embodiment, the processor 240 determines to allow the UE 100 to execute the transmission/reception operations of the D2D synchronization signal in response to the fact that the D2D range information indicates the Long class. The processor 240 determines to allow the UE 100 not to execute the transmission/reception operations of the D2D synchronization signal in response to the fact that the D2D range information indicates the short class or the middle class.

The processor 240 transmits information indicating the result of the determination to the UE 100 through the radio transceiver 210. The information is transmitted by, for example, individual RRC signaling. Alternatively, the information may be transmitted by an L1/L2 control signal (PDCCH/ePDCCH) or broadcast RRC signaling.

Specifically, when determining to allow the UE 100 to execute the transmission/reception operations of the D2D synchronization signal, the processor 240 transmits information indicating instruction or permission of the transmission/reception operations of the D2D synchronization signal to the UE 100.

In contrast, when determining to allow the UE 100 not to execute the transmission/reception operations of the D2D synchronization signal, the processor 240 does not instruct the transmission/reception operations of the D2D synchronization signal. Alternatively, the processor 240 transmits information indicating prohibition or refusal of the transmission/reception operations of the D2D synchronization signal to the UE 100.

(Operation Sequence)

Figure 7:
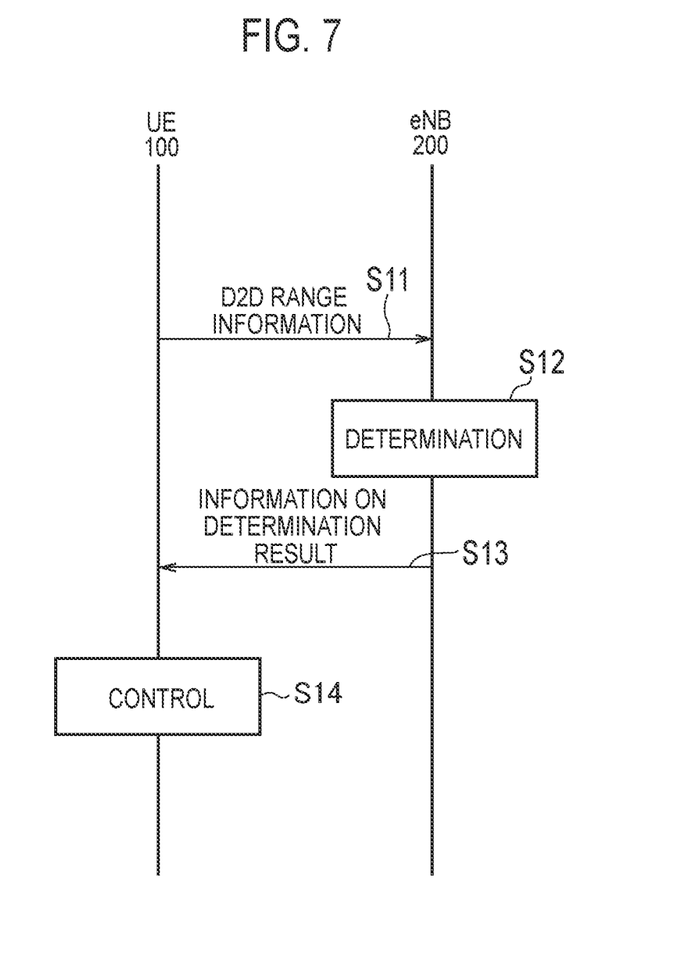
FIG. 7 is a sequence diagram illustrating an operation sequence according to the embodiment.

FIG. 7 is a sequence diagram illustrating an operation sequence according to the embodiment.

In step S11, as illustrated in FIG. 7, the UE 100 transmits the D2D range information to the eNB 200.

In step S12, the eNB 200 determines based on the D2D range information whether to allow the UE 100 to execute the transmission/reception operations of the D2D synchronization signal.

In step S13, the eNB 200 transmits the information indicating the result of the determination to the UE 100.

In step S14, the UE 100 controls in response to the received information whether to execute the transmission/reception operations of the D2D synchronization signal.

SUMMARY OF EMBODIMENT

In the embodiment, the UE 100 supporting the wide range of the D2D discovery procedure transmits the D2D synchronization signal. Thus, even when the inter-cell synchronization is not taken, the inter-UE synchronization is directly established, and thus the inter-cell discovery procedure can be performed in the wide range.

In contrast, the UE 100 supporting only the narrow range of the D2D proximity service does not transmit the D2D synchronization signal. This makes it possible to avoid the occurrence of the interference and the increase in the UE power consumption.

Modification Example 1

In the above-described embodiment, the case where the D2D range information is information indicating any one of three levels of classes (Long, middle, and short) was described as an example.

However, the D2D range information may be a value of the permissible communication range of the UE 100 in the D2D proximity service. The value of the permissible communication range may be a specific numerical value such as 50 m, 200 m, or 500 m or may be an index value corresponding thereto (for example, "1"=50 m, "2"=100 m).

In this case, the eNB 200 determines based on the D2D range information (value of the permissible communication range) as follows, for example. The eNB 200 determines to allow the UE 100 to execute the transmission/reception operations of the D2D synchronization signal in response to the fact that the D2D range information (value of the permissible communication range) is equal to or greater than a threshold. The eNB 200 determines to allow the UE 100 not to execute the transmission/reception operations of the D2D synchronization signal in response to the fact that the D2D range information (value of the permissible communication range) is less than the threshold.

Alternatively, the eNB 200 may determine whether the D2D range information corresponds to any of the long class, the middle class, or the short class by comparing the inter-eNB distance or the magnitude of own cell (macrocell or small cell) with the D2D range information (value of the permissible communication range).

Modification Example 2

In the above-described embodiment, the case where the eNB 200 determines based on the D2D range information received from the UE 100 whether to allow the UE 100 to execute the transmission/reception operations of the D2D synchronization signal was described as an example.

However, when the PCE 400 manages the D2D range information of each UE 100, the eNB 200 may acquire the D2D range information from the PCE 400 without receiving the D2D range information from the UE 100. Alternatively, the eNB 200 may acquire the D2D range information from an OAM or an MME. Then, the eNB 200 determines based on the D2D range information acquired from the PCE 400 or the like whether to allow the UE 100 to execute the transmission/reception operations of the D2D synchronization signal and may transmit information indicating the result of determination to the UE 100.

Alternatively, the eNB 200 may compare the information received from the PCE 400 with the information received from the UE 100 and perform the determination. In this case, the eNB 200 regards that the information is valid when the information received from the PCE 400 and the information received from the UE 100 coincide with each other. The eNB 200 may determine that the smaller information (narrow range) of the information received from the PCE 400 and the information received from the UE 100 is valid and that the larger information (wide range) is valid.

Modification Example 3

In the above-described embodiment, the case where the UE 100 controls whether to execute the transmission/reception operations of the D2D synchronization signal in response to the determination result of the eNB 200 was described as an example.

However, the UE 100 may autonomously control whether to execute the transmission/reception operations of the D2D synchronization signal based on the D2D range information without being based on the determination result of the eNB 200. Determination logics based on the D2D range information are the same as those in the above-described embodiment.

In this case, the UE 100 may notify the eNB 200 of the execution of the transmission/reception operations of the D2D synchronization signal when executing the transmission/reception operations of the D2D synchronization signal. In addition, the UE 100 may notify the eNB 200 of the stop of the transmission/reception operations of the D2D synchronization signal when stopping the transmission/reception operations of the D2D synchronization signal.

Modification Example 4

In the above-described embodiment, the eNB 200 determined based on the D2D range information whether to allow the UE 100 to execute the transmission/reception operations of the D2D synchronization signal. In addition to such determination or in place of such determination, the eNB 200 may perform the following determination and control.

Timing Offset

The eNB 200 may determine based on the D2D range information received from the UE 100 whether to notify (set) timing offset to the UE 100. The timing offset is information indicating deviation of inter-eNB synchronization in the case of inter-eNB (inter-cell) asynchronization. For example, the eNB 200 allows the UE 100 not to transmit the D2D synchronization signal when the D2D range information of the UE 100 is the "middle" class, but determines to notify the timing offset to the UE 100.

By such determination, the timing offset can be appropriately provided to the UE 100 capable of using the inter-cell D2D proximity service, so that it is possible to facilitate the inter-cell D2D proximity service.

Determination of Transmission Power

The eNB 200 may control transmission power of the UE 100 based on the D2D range information received from the UE 100. In this case, the eNB 200 may also control the transmission power of the UE 100 in consideration of the frequency of the cell. This is because propagation loss becomes higher as an operating frequency of the cell becomes higher. The frequency of the cell may be determined from the "Frequency list" included in the D2D interest notification.

Determination of Modulation Scheme and Repetition

The eNB 200 may control modulation scheme and repetition (number of repetitive transmission times) to be applied to the UE 100, based on the D2D range information received from the UE 100. In this case, the eNB 200 may also control modulation scheme and repetition (number of repetitive transmission times) to be applied to the UE 100 in consideration of the frequency of the cell. This is because propagation loss becomes higher as an operating frequency of the cell becomes higher. The frequency of the cell may be determined from the "Frequency list" included in the D2D interest notification.

Other Embodiments

In the above-described embodiment, an inter-base-station cooperative operation using an X2 interface was not particularly mentioned. However, the inter-base-station cooperative operation may be introduced.

For example, when the UE 100 in the cell #1 wishes for long reception, the eNB 200 having the cell #1 requests long transmission setting through the X2 interface with respect to the other eNB having an adjacent (or next adjacent) cell. Alternatively, when the UE 100 in the cell #1 wishes for long transmission, the eNB 200 having the cell #1 requests long reception setting through the X2 interface with respect to the other eNB having an adjacent (or next adjacent) cell.

Here, the long transmission setting/long reception setting includes, for example, transmission/reception resource pool information, an offset parameter (for TDD frame adjustment), a CP length, MCS, a hopping parameter, the number of repetition times, and D2D RNTI. In the case of D2D synchronization signal setting, the long transmission setting/long reception setting also includes a signal identifier for D2D synchronization signal (SS ID). In the timing offset setting, the long transmission setting/long reception setting also includes a timing offset value.

In addition, during the handover of the UE 100, the D2D range information of the UE 100 may be notified to a handover destination (adjacent cell). For example, the D2D range information is included in a handover request transmitted from a handover source to the handover destination. Moreover, the cell of the handover destination includes the setting in which the D2D range information after the handover is included in a response to a handover request (handover request ACK). Thus, the UE 100 can be appropriately set in the cell of the handover destination without blocking the service.

In addition, when the permissible D2D range (permissible communication range) is set for each cell, the permissible D2D range (permissible communication range) in own cell may be notified to the adjacent cell. In this case, inter-cell notification is performed by an eNB Configuration Update (base station setting update) Message or the like. Thus, the adjacent cell can determine how to set the UE 100 in own cell.

In the above-described embodiment, the case where the permissible communication range is the permissible communication range in the D2D discovery procedure (Discovery) was described as an example. However, the permissible communication range may be a permissible communication range in the D2D communication (Communication) rather than the permissible communication range in the D2D discovery procedure.

The LTE system was described as an example of the mobile communication system in the above-described embodiment, but the invention is not limited to the LTE system and may be applied to a system other than the LTE system.

APPENDIX

Introduction

Inter-cell (and also inter-frequency) neighbour cell support was discussed and the following agreements were reached.

1. Support both deployment scenarios for inter-cell discovery: 1) synchronized deployment, and 2) asynchronized deployment.

2. Support both resource allocation strategy of operator: 1) overlapping discovery resource between cells, 2) non-overlapping discovery resource between cells.

3. The serving cell may provide in SIB information which neighbour frequencies support ProSe discovery.

4. For synchronized, full-overlapping, intra-frequency deployment, the eNB provides just one resource pool (no D2DSS information required)

It is necessary to further discuss what information is required for other deployments and how much data that will comprise (feasible for SIB?)

In this appendix, the remaining issues for supporting inter-cell discovery are clarified along with possible solutions.

(2. Remaining Issues in Inter-Cell Discovery Aspect)

(2.1. Synchronization Schemes Under Asynchronous Deployment)

Although many issues for support of inter-cell discovery may be solved by the consideration for inter-frequency and inter-PLMN discovery proposed, it is still necessary to discuss how to handle asynchronous deployment. As proposed, it depends on how to ensure (rough) synchronization between peer UEs and following options could be considered.

Option A: The serving cell provides a timing offset which indicates the time differences between the serving cell and its neighbor cells.

Option B: The UE directly monitors PSS/SSS and MIB transmitted from the neighboring cell(s).

Option C: The UE directly monitors PD2DSS/SD2DSS (and possibly PD2DSCH) transmitted from the announcing UE in the neighbor cell.

Option B is the simplest option, but it has significant drawback that the successful range of discovery depends on the successful decoding range of PSS/SSS which is transmitted by the neighbor cell. Therefore, Option B should have lower priority.

Figure 8:
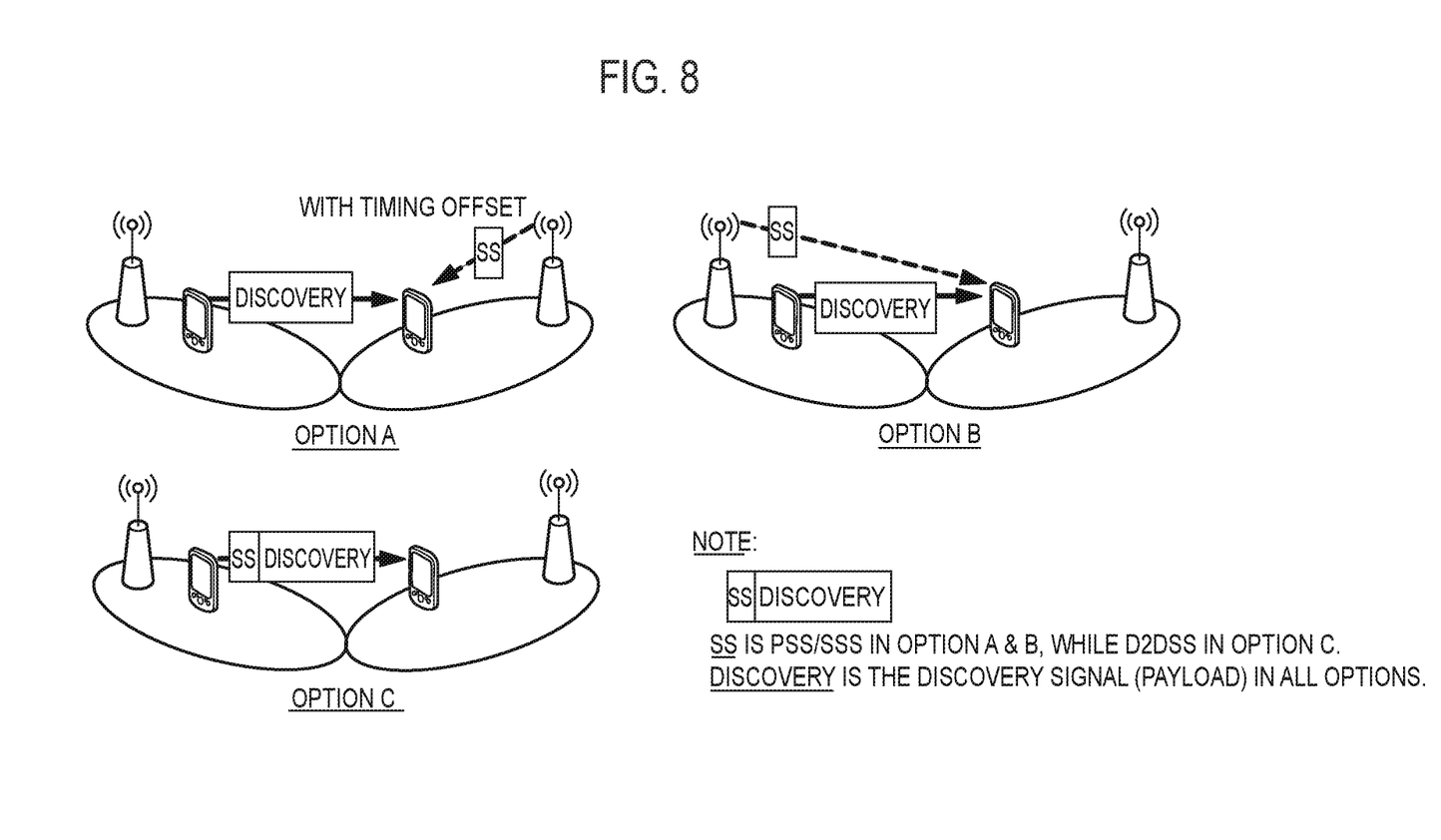
FIG. 8 is a figure according to the appendix.

Proposal 1: For inter-cell discovery under the asynchronous deployment scenario, the network should have the option to use either timing offset (Option A) or D2DSS (Option C) to allow the UE to synchronize with discovery resources from the neighboring cell. FIG. 8 illustrates synchronization options for inter-cell discovery.

(2.2. Issue on Option A)

If proposal 1 is acceptable, Option A is a possibility for synchronization between UEs on different cells. It's still unclear whether a single timing offset is sufficient to support the synchronization needs for all UEs which are camped/ served by a cell. However, based on the agreement that "For synchronized, full-overlapping, intra-frequency deployment, the eNB provides just one resource pool (no D2DSS information required)", it may be assumed that no additional synchronization is required for the UEs as long as the cells were synchronized. Therefore, the timing offset is common to all UEs for the concerned cell, and per-UE offset is not needed.

Confirmation 1; If the serving cell provides the timing offset to the UEs, a common timing offset is applicable to all UEs for the concerned cell.

However, since Rel-12 does not assume any coordination among cells over X2 interface, the OAM may be required to provide the cells with the timing offsets for each of its neighbor cells. The complexity for the OAM to provide this level of support is especially high for urban deployments under dense cellular deployments with complex neighbor relations.

Observation 1: Under dense cellular deployments with complex neighbor relations, significant efforts are required of the OAM to support the provisioning of timing offsets.

(2.3. Issue on Option C)

If proposal 1 is acceptable, Option C is also a possibility for inter-cell discovery synchronization. As for PD2DSS and SD2DSS, the serving cell should determine which UE needs to transmit the D2DSS, which it was seen in RAN1 agreements below;

Agreement
For in-coverage
A UE can become a D2D synchronization source at least if it is configured to do so by the eNB.
It is necessary to further discuss whether any additional criteria have to be met before a UE that is configured to become a D2D synchronization source can become one.
It is necessary to further discuss whether any special UE reporting is needed to assist the eNB.
Agreements
D2DSS transmission configuration is the same between D2D discovery and D2D communication if NW supports both D2D communication and discovery.
For Type 1 discovery
For a cell, within a discovery period, the first sub-frame of the transmission pool can be used for transmitting the PD2DSS and SD2DSS by UEs transmitting discovery signals.
If Type 1 resource pool is configured using SIB then the PD2DSS and SD2DSS sequence transmitted is configured using SIB.
The same PD2DSS and SD2DSS sequences is used for D2D communication.
Else sequence transmitted can be configured using dedicated RRC signaling.
For Type 2B discovery
eNodeB can instruct UE to transmit PD2DSS and SD2DSS.
For both Type 1 and Type 2B the reception pool information contains information (implicitly or explicitly) on which time resources and sequences UE should monitor for PD2DSS and SD2DSS if transmission of PD2DSS and SD2DSS is configured.
It is necessary to further discuss if all discovery UEs transmit D2DSS.
Agreements
For reception, in-coverage UEs may need D2DSS from another in-coverage UEs for time/freq. synchronization in some inter-cell scenarios.

Although reached many important agreements have been reached, some issues relating to D2DSS remain unclear. At least it is clarified that the eNB has the responsibility to configure the UE(s) for the transmission of D2DSS. In addition, it is intended D2DSS may be needed for inter-cell discovery. One possibility would be to assume that all UEs, which requests dedicated transmission resources with UEAssistanceInformation or informs of "interested in announcing" with the ProSe Indication, are configured with transmission and/or reception of D2DSS; however, this may cause excessive inter-cell interference and degrade the discovery probability due to the lack of time/frequency synchronization between UEs. Therefore, configuring all UEs for the transmission of D2DSS should be avoided. Note that it's assumed at this point D2DSS reception is configured to all UEs.

Proposal 2: RAN2 should not assume that all UEs are configured with D2D transmission of PD2DSS and SD2DSS.

If proposal 2 is acceptable, the issue is how the eNB determines which UEs should be configured to transmit D2DSS. In other words, the eNB has no way to know which UE pair needs D2DSS for the discovery.

One possibility is to use the authorized discovery range for announcing or authorized announcing range specified. The authorized announcing range is provided by ProSe Function per PLMN but it is still necessary to further discuss the details including the relationship to the Range Class. If the authorized announcing range can be interpreted as a UE's interest for "longer range" of discovery, the eNB may determine which UEs should be configured according to the authorized announcing range. In other words, the UE which is only interested in "shorter range" of discovery (e.g. non-Inter site distance (ISD)) may not need to be configured with D2DSS transmissions.

Proposal 3: RAN2 discuss whether the authorized announcing range can be also used to determine which UEs need to be configured with D2DSS transmission.

In above discussion, it's assumed that D2DSS reception is configured to all UEs. The drawback with this assumption is the increased UE complexity and power consumption if the UE has to always monitor D2DSS e.g., requirement for high speed switching between Tx and Rx in the UL transceiver. So, it's preferred that the reception of D2DSS is configured only to the UE which needs it. It may be considered that if the authorized announcing range is also defined for discovery "monitoring" then it may be useful to determine which UEs should be configured with D2DSS reception.

Proposal 4: RAN2 discuss whether all UEs should always monitor D2DSS.

The entire content of U.S. Provisional Patent Application No. 62/056,088 (filed on Sep. 26, 2014) is incorporated in the present specification by reference.

INDUSTRIAL APPLICABILITY

The present invention is useful in the field of radio communication.

The invention claimed is:
1. A base station used in a mobile communication system supporting a D2D proximity service which enables direct device to device communication, the base station comprising:
a receiver configured to receive D2D range information from a user terminal, the D2D range information indicating a permissible communication range of the user terminal in the D2D proximity service;

a controller configured to determine, based on the D2D range information, whether to allow the user terminal to execute transmission/reception operations of a D2D synchronization signal to directly establish device to device synchronization; and
a transmitter configured to transmit information indicating results of the determination to the user terminal, wherein
a plurality of classes including classes each corresponding to a plurality of levels of permissible communication ranges are defined,
the D2D range information is information indicating a class of the plurality of classes,
the plurality of classes includes:
a first class that supports a wide range of the D2D proximity service including a serving cell and an adjacent cell; and
a second class that supports only a narrow range of the D2D proximity service not including the adjacent cell,
the controller is configured to determine to allow the user terminal to execute the transmission/reception operations of the D2D synchronization signal in response to the D2D range information indicating the first class, and
the controller is configured to determine to allow the user terminal not to execute the transmission/reception operations of the D2D synchronization signal in response to the D2D range information indicating the second class.

2. The base station according to claim 1, wherein
the D2D range information includes at least one of a resource allocation request, a terminal capability notification, or a D2D interest notification that is transmitted to the base station from the user terminal,
the resource allocation request is information that requests assignment of a radio resource,
the terminal capability notification is information that notifies capability of the user terminal, and
the D2D interest notification is information on interest of the user terminal in the D2D proximity service.

3. The base station according to claim 1, wherein
the permissible communication range includes a permissible communication range for transmission in the D2D proximity service and a permissible communication range for reception in the D2D proximity service, and
the D2D range information includes information that identifies whether the permissible communication range is used for either of the transmission or the reception in the D2D proximity service.

4. The base station according to claim 1, wherein
the D2D proximity service includes a discovery procedure that is performed such that one user terminal discovers the other user terminal, and
the permissible communication range is a permissible communication range in the discovery procedure.

5. The base station according to claim 1, wherein
the controller is further configured to determine whether to notify the user terminal of a timing offset indicating deviation of inter-cell synchronization in the present base station, based on the D2D range information.

6. The base station according to claim 1, wherein
the controller is further configured to control transmission power of the user terminal in the D2D proximity service, based on the D2D range information.

7. The base station according to claim 1, wherein
the controller is further configured to transmit the D2D range information or cell range information indicating a permissible communication range of a present cell in the D2D proximity service to another base station that manages the adjacent cell.

* * * * *